United States Patent [19]

Takehara et al.

[11] Patent Number: 4,976,300
[45] Date of Patent: Dec. 11, 1990

[54] PNEUMATIC TIRE PROFILE

[75] Inventors: Kenji Takehara; Kenji Saitou, both of Kobe, Japan

[73] Assignee: Sumitomo Rubber Industries, Ltd., Hyogo, Japan

[21] Appl. No.: 341,218

[22] Filed: Apr. 21, 1989

[30] Foreign Application Priority Data

Apr. 22, 1988 [JP] Japan .................. 63-101010
May 11, 1988 [JP] Japan .................. 63-115393

[51] Int. Cl.$^5$ .............................................. B60C 3/04
[52] U.S. Cl. ................................. 152/454; 152/209 R
[58] Field of Search ................ 152/454, 209 R, 538, 152/526, 539, 548

[56] References Cited

U.S. PATENT DOCUMENTS 4,037,637 7/1977 Arimura et al. .................. 152/454
4,815,511 3/1989 Brayer et al. .................. 152/454 X

FOREIGN PATENT DOCUMENTS 194108  9/1986 European Pat. Off. .......... 152/454
295898 12/1988 European Pat. Off. .......... 152/454
8803094  5/1988 World Int. Prop. O. .......... 152/454

Primary Examiner—Caleb Weston
Assistant Examiner—Geoffrey L. Knable
Attorney, Agent, or Firm—Birch, Stewart, Kolasch & Birch

[57] ABSTRACT

A pneumatic tire in which various tire performances, such as wear resistance, uneven wear resistance, fuel economy and the like are all improved in a good balance is disclosed, wherein a first point gap LA defined as the radial distance between a standard first point An on the tire equator on the tread face Tn when the tire is inflated to a standard internal pressure and a 10% first point As on the tire equator on the tread face Ts when the tire is inflated to 10% of said standard internal pressure is smaller than 1.0 mm, a third point gap LC defined as the radial distance between a standard third point Cn on said trade face Tn spaced apart 0.45 times of the tread width TWn from said standard first point An and a 10% third point Cs defined as the intersection of the radial line passing through said standard third point Cn with said tread face Ts is 1.0 mm or larger and smaller than 4.0 mm, and the ratio LC/LA of said third point gap LC to said first point gap LA is 4.0 or larger.

1 Claim, 5 Drawing Sheets

PNEUMATIC TIRE PROFILE

BACKGROUND OF THE INVENTION

The present invention relates to a pneumatic tire improved in tire performances, such as wear resistance, uneven wear resistance, fuel economy and the like, all in a good balance.

Tires of radial structure in which the carcass cords are arranged almost at the right angle to the equatorial plane of the tire have been widely used because of their superior wear resistance and steering stability.

Such radial tires are provided with the hoop effect by disposing outside the carcass a so-called belt formed by arranging organic or inorganic cords at relatively small angles to the equatorial plane of the tire and thereby having a relatively large stiffness.

On the other hand, the shape of the radial tire has been designed in a spontaneously balanced shape, by which the carcass profile is not changed from that in the vulcanizing mold when the tire is inflated to a standard internal pressure.

Here, the spontaneously balanced shape means a carcass profile obtained by the theory of spontaneously balanced shape which was proposed by W. Hofferberth in Kautsch. Gummi (8-1955, 124 to 130).

In this theory, the belt located in the tread portion of the tire is regarded as a stiff ring body which does not change its shape when the internal pressure is increased, and it is intended to preliminarily form the carcass extending between this belt and the bead cores which also does not change its shape, by using a vulcanizing mold, with a shape which generates no deformation when the tire is inflated.

The carcass profile based on the theory of spontaneously balanced shape is formed with the intention of causing no deformation on the carcass when the tire is inflated as described above, that is, causing the tensile force to act evenly on the carcass cord.

Though the Hofferberth's theory related to bias tires, it was developed by Akasaka in "The sectional shape of the radial tire," Japan Composite Material Magazine Vol.3,4 (1977), 149 to 154, that the theory also be applied to radial tires.

For application of this theory of the spontaneously balanced shape, it is desired to understand at least the following two facts.

In the first place, the belt is not a perfect stiff body in practice, even when composed of metallic cords, but is slightly deformed by the application of internal pressure, and in particular, the smaller the tire aspect ratio is, the more the belt is likely to be deformed by push-up of the carcass due to the inflation with internal pressure.

In the second place, the bead portion is stiffer due to the turnup part of the carcass, bead apex and other reinforcing layers, and the theory of spontaneously balanced shape cannot be applied in the region from the bead core to the inflexion point of the carcass profile generally called the rim point, that is, the equivalent bead position, and therefore, the curve based on the theory should be considered to start from the equivalent bead position.

Figure 8:
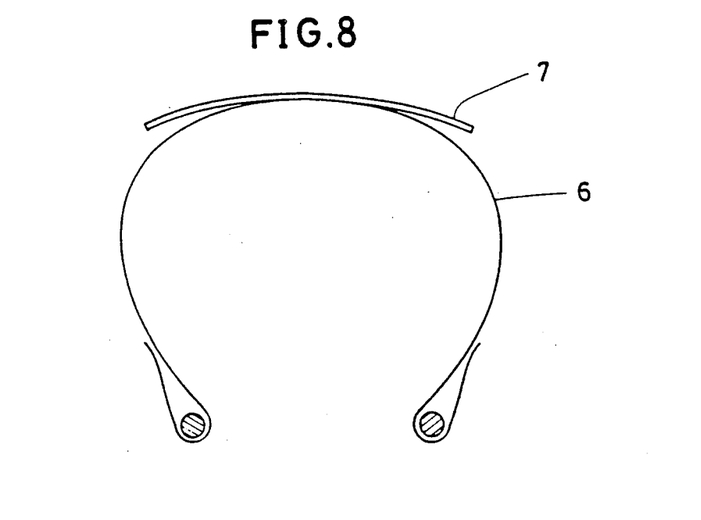
FIG. 8 is a diagram showing the structure of a prior art tire only by the carcass and belt.

In such radial tires having the carcass profile depending on the theory of the spontaneously balanced shape, especially tires in which the carcass profile is closer to a circle because of its relatively high aspect ratio, and even when the tire is inflated to the standard internal pressure, the radially outward deformation of the carcass 6 between the carcass 6 and the belt 7 at the shoulder in particular near the edge of the belt 7, is small as shown in FIG. 8. In the theory of spontaneously balanced shape, the carcass is assumed to have no elongation due to the inflation, but in practice, the carcass slightly extends and the carcass profile based on the theory of spontaneously balanced shape expands to a roughly similar figure, so that the bonding force between the carcass 6 and the belt 7 by pressing against each other cannot be so large, and therefore the constraint between the carcass 6 and the belt 7 is inferior.

In consequence, the tension acting on the carcass 6 hardly works on the belt 7, particularly around its belt edges, and the belt 7 cannot exert its hoop effect satisfactorily. Then the tread profile in the shoulder region tends to become uneven, and together with the fact that the constraint by the belt 7 falls down, an uneven wear is generated as the tires are driven, thereby decreasing the wear resistance.

Above all, in high aspect ratio tires, there is likely to be generated spot wear in which the tread is locally worn at portions with a small ground contact pressure and a large slipping with the road.

In addition, because the amount of the bend of belt in the radial direction while rolling is increased, the stress acting on the belt 7 is also increased, and the rolling resistance is raised, thereby worsening the fuel consumption.

In the Japanese Patent Application No. 61-252465, the present applicant proposed a radial tire for passenger cars which is improved in wear resistance, uneven wear resistance and fuel economy by increasing the amount of the radially outward movement of the shoulder portions when inflated to the standard pressure so as to enlarge the radius of curvature of the tread and thereby to act the tension of the carcass 6 effectively on the belt 7 and to increase the hoop effect of the belt 7. Incidentally, a manufacturing method of such radial tires for passenger cars was proposed in the specification and drawings of Japanese Patent Application No. 62-13408.

The present invention was completed after a further study on the wear resistance and fuel consumption and other factors by paying attention mainly to the amount of the radially outward movement of the tread caused at various points by tire inflation.

It is therefore a primary object of the present invention to provide a pneumatic tire, in which, by the inflation to the standard internal pressure, the tread profile is changed into a preferable shape at respective points, and the above mentioned tire performances are widely improved in comparison with prior art tires.

As the amount of movement at the shoulder portions of this tire is large, the hoop effect is enhanced at these portions to increase the constraint by the belt, thereby exerting the above improving effects.

Figure 4:
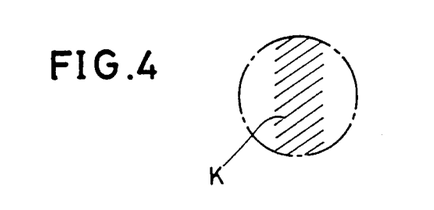
FIGS. 4 to 7 are diagrams roughly showing shapes of the ground contact face and distribution of ground contact pressure.

Consequently, though the ground contacting shape in the prior art tires becomes almost circular, as shown in FIG. 4, and the portion K with a large ground contact pressure exists in the crown centered on the equator of the tire, the ground contacting face of the tire according to the present invention becomes large in area and almost rectangular in shape, and the portion K, K with a large ground contact pressure exist at the side edges, that is, the shoulder regions, and the above effects were thereby brought about.

In order to further improve tire performances, it was learned to preferably maintain an appropriate strong ground contact pressure at the crown region as well as to increase the ground contact pressure at the shoulder regions, and accordingly to roughly even the ground contact pressure in the tire.

Figure 5:
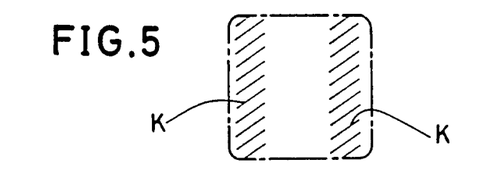
Figure 6:
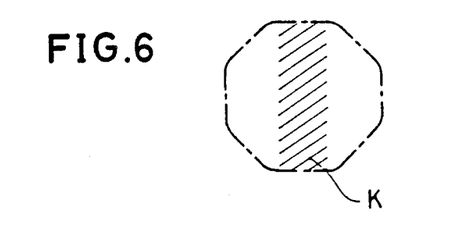
Figure 7:
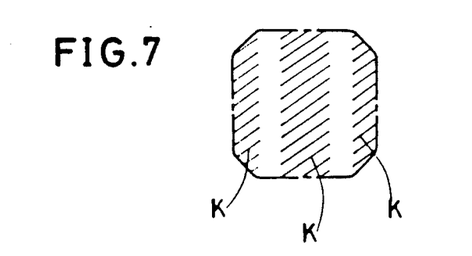

Therefore, from the viewpoint of making uniform the ground contact pressure, the present inventors continued studying on the tread profile and the tread thickness at various positions, and then they reached the conclusions that, by designing the tread profile in a so-called double-radius profile in which the tread face is composed of arcs having different radii of curvature between the crown region and the shoulder regions, there can be formed tires having a relatively wide ground contact face of a roughly octangular shape and locating the portion K with a large ground contact pressure at the crown region as shown in FIG. 6, and that, combining the tread face showing the ground contact face of the FIG. 6 shape and that showing the FIG. 5 shape, the distribution of the ground contact pressure can be made uniform as shown in FIG. 7, and thereby the tire performances can be further improved.

It is therefore, another object of the present invention to provide a highly improved pneumatic tire in which the hoop effect is enhanced at the shoulder regions and at the same time the ground contact pressure in the ground contact face is uniforme.

SUMMARY OF THE INVENTION

According to one aspect of the present invention, that is, according to a first embodiment, a pneumatic tire is provided with a profile wherein a first point gap LA, which is the distance in the radial direction between a standard first point An which is a point on the equator of the tire on a tread face Tn when inflated to a standard internal pressure and a 10% first point As which is a point on the equator of the tire on a tread face Ts when inflated to 10% of the standard internal pressure is smaller than 1.0 mm, a third point gap LC which is the distance in the radial direction between standard third points Cn which are points on said trade face Tn centered on the standard first point An and spaced apart each from the other by 0.9 times of the tread with TWn when inflated to the standard internal pressure and 10% third points Cs which is the intersection of the radial line passing through each of the points Cn with the tread face Ts is 1.0 mm or larger and smaller than 4.0 mm, and the ratio LC/LA of the third point gap LC to the first point gap LA is 4.0 or larger.

According to further aspect of the present invention, that is, according to a second embodiment, the above-mentioned pneumatic tire is characterized in that the common logarithm $\log_{10}(RCn/RSn)$ of the ratio RCn/RSn of a standard inner radius RCn which is the radius of curvature of the arc passing the standard first point An and standard second points Bn which are points on the tread face Tn centered on the standard first point An and spaced apart each from the other by 0.5 times of the tread width TWn when inflated with the standard internal pressure to a standard outer radius RSn, which is the radius of curvature of the arc passing the standard first point An and the standard third points Cn is 0.1 or more and 0.7 or less, the standard inner radius RCn is more than 2.7 times and less than 5.0 times a value TWn/S obtained by dividing the tread width TWn when inflated to the standard internal pressure by the tire aspect ratio S which is the ratio Hn/SWn of the height Hn of the tire when inflated to the standard internal pressure to the maximum tire width SWn, the absolute value |a-b| of the difference between the tread thickness (a) at the standard first point An and the tread thickness (b) at the standard second points Bn is 0.3 mm or less, the thickness b-c obtained by subtracting the tread thickness c at the standard third point Cn from the tread thickness b is 0.5 mm or more and 3.0 mm or less, and a fourth point gap LE which is the distance in the axial direction between a standard fourth point En on the sidewall spaced from the base of the bead by 30 mm in the radial direction when inflated to the standard internal pressure and a 10% fourth point ES on the sidewall spaced from the base of the bead by 30 mm in the radial direction when inflated 10% of the standard internal pressure is 1.0 mm or smaller.

[OPERATIONS]

As a result of providing such structure, the amount of the outward movement in the shoulder regions becomes larger than that in the crown region, and the carcass pushes up the belt especially around the shoulder regions as the internal pressure is increased. Accordingly, the bonding force between the carcass and the belt is increased, and hence the tensile force acting on the carcass works on the belt in particular at its edge. The hoop effect of the belt is therefore enhanced.

Concerning the shape of the ground contact face, the portions K, K with a large ground contact pressure exist in the shoulder of the tire as shown in FIG. 5, and the area of the ground contact face can be widened. Accordingly, the wear resistance is raised, uneven wear such as spot wear can be reduced, the fuel consumption property can be improved due to the decreased rolling resistance, the wet brake performance is advanced, the cornering power is increased, and the stability when cornering and straight running and the steering stability can be improved.

In the second embodiment, the standard inner radius RCn is set at 2.7 times or more and 5.0 times or less of the value TWn/S obtained by dividing the tread width TWn when the standard internal pressure is applied by the aspect ratio S. This causes an optimization of the radius of curvature of the arc at the crown with regard to the unit tread width, that is, the standard inner radius RCn in the shape of a tread face Tn when inflated to the standard internal pressure. Further, this equal to setting the difference between the radius at the standard first point An on the equator of the tire and the radius at the standard third points Cn on the shoulder regions in the optimum condition. By determining this value by considering the aspect ratio S, the operation and effects brought about by the above first embodiment are enhanced.

In the second invention, moreover, the common logarithm of the ratio of the standard inner radius RCn to the standard outer radius RSn is in the range between 0.1 and 0.7. This leads the tire into a double-radius profile in which the ground contact face becomes relatively large and the portion K with a large ground contact pressure is located in the crown region when the standard internal pressure is applied as described in FIG. 6. By the addition of this aspect, there can be obtained a ground contact pressure distribution almost uniformed throughout the entire ground contact face, as shown in FIG. 8.

Besides, the difference between the tread thicknesses a and b at the standard first point An and standard second point Bn, respectively, is set at 0.3 mm or less and the thickness b-c obtained by subtracting the tread thickness c at the standard third point Cn from the above tread thickness b is set at 0.5 mm or more and 3.0 mm or less. In this way, by slightly reducing the tread thickness at the shoulder regions, the pushing-up force of the shoulder can be enforced, the tread profile is set most appropriately, and the preferable double-radius profile is maintained, which enhances the above-mentioned effects.

At the same time, the distance LE in the axial direction between the standard fourth point En and the 10% fourth point ES is set at 1.0 mm or shorter. This prevents an increase of stiffness at the bead portion by the inflation of the tire, and avoids the worsening of the ride comfort. Ride comfort tends to be reduced when the hoop effect is raised by expansion at the shoulder regions as stated above, but in the present invention the ride comfort can be effectively prevented from decreasing by setting the above value LE at 1.0 mm or less in contrast to a relatively large value in prior art tires.

[EMBODIMENT]

DETAILED DESCRIPTION OF THE DRAWINGS

The present invention will now be described in detail, referring to the drawings, in which.

DETAILED DESCRIPTION OF THE INVENTION

Figure 1:
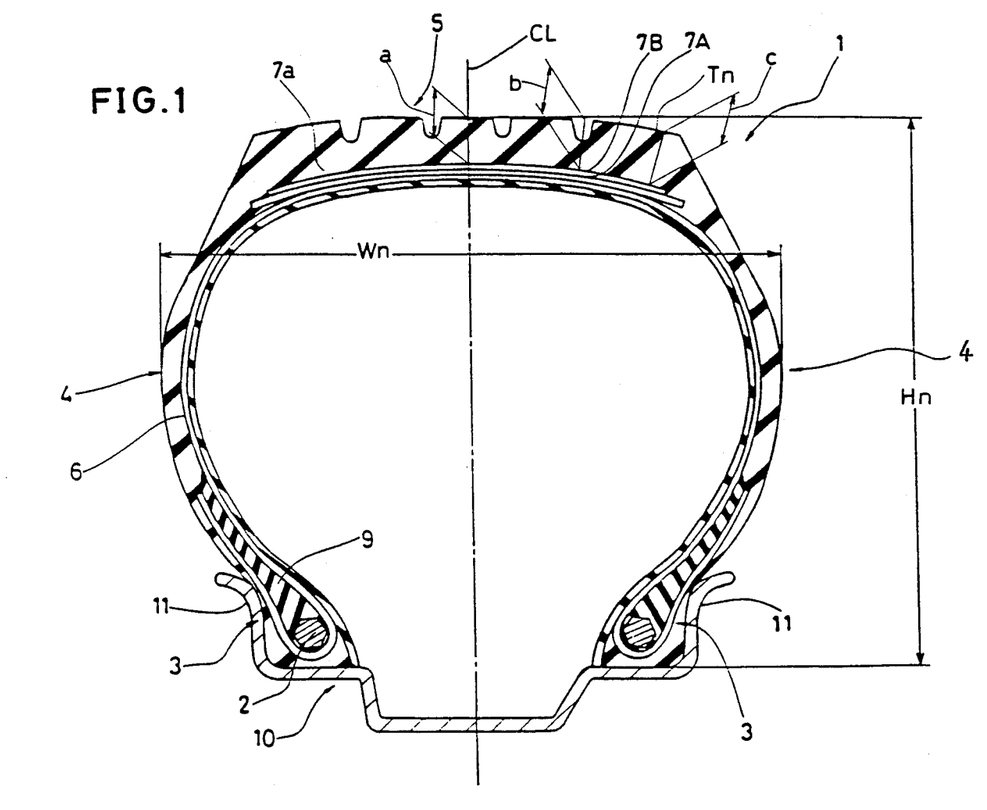
FIG. 1 is a sectional view showing an embodiment of the present invention.

FIG. 1 a pneumatic tire 1 mounted on a standard rim 10 and inflated with air to a standard internal pressure, for example, 2.1 kg/sq. cm. The tire 1 has a pair of bead portions 3 through which a bead core 2 passes, a sidewall portion 4 extending radially outwardly from each bead portion 3, and a tread portion 5 extending between the edges of the sidewall portions, and a carcass 6 turned up around the bead cores 2 from the inside to the outside, with the main portion of the carcass extending through the sidewall portions 4 and the tread portion 5. In the tread portion, a belt 7 is disposed outside the carcass 6, and between the main portion and turnup portions of the carcass 6, bead apexes 9 are disposed. The tire 1 is mounted on a so-called standard rim 10 by matching the bead portions 3 with the flanges 11 of the rim 10.

The carcass 6 is composed of cords arranged radially at about 80 to 90 degrees to the equator CL of the tire. For the carcass cords, organic fiber cord such as nylon, polyester, rayon and aromatic polyamide are employed. Inorganic fiber cords such as metals can also be used. The carcass 6 is composed of one to three plies.

The belt 7 is composed of, for example, two plies of a first ply 7A disposed on the carcass 6 side and a second ply 7B thereabove, and the first and second plies 7A and 7B are made of metallic cords and inclined in reverse directions with respect to the tire equator CL at relatively small angles to the tire equator CL. The first ply 7A is wider than the second ply 7B, and both edges of the first ply 7A are extended downward of the tread edges where the sidewall portions 4 and the tread portion 5 intersect.

The tire 1 of this embodiment is, meanwhile, formed in a slightly depressed shape in which the ratio of the height Hn of the tire which is the distance from the bottom of the bead 3 to the highest point of the tread Tn that is generally the standard first point on the equator CL of the tire on the tread face Tn when inflated to the standard internal pressure, to the tire maximum width Wn is less than 1, for example, about 0.9.

Figure 2:
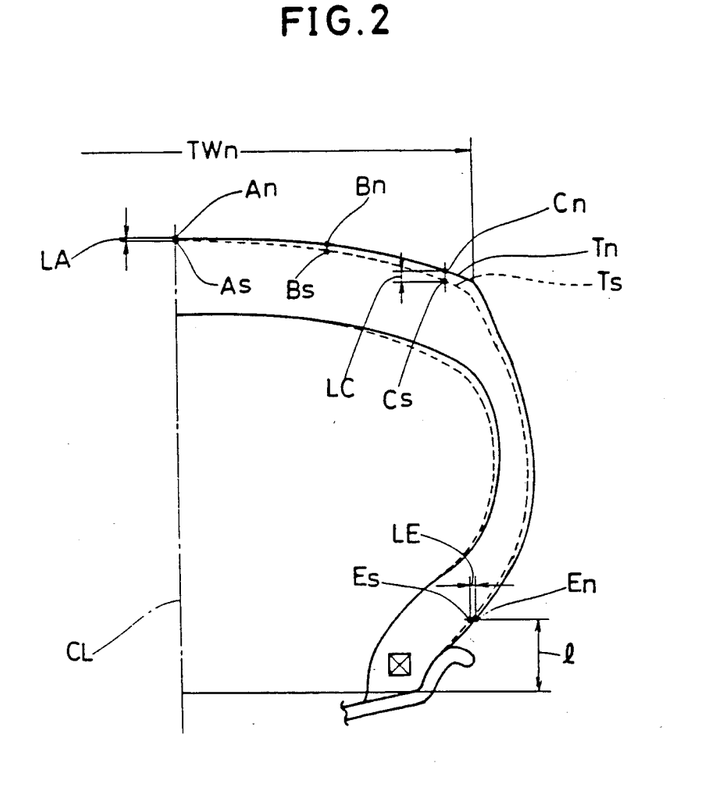
FIG. 2 is a diagram showing the profile of the tire at standard internal pressure and 10% internal pressure.

In FIG. 2, the profile of the tire 1 when inflated to the standard internal pressure is shown by a solid line, and that when inflated to 10% of the standard internal pressure (called 10% internal pressure hereinafter) is shown by a broken line, and the point on the tire equator on the tread face Tn when inflated to the standard internal pressure is defined as a standard first point An, the points on the tread face Tn which are spaced from each other by 0.5 times of the tread width TWn and centered on the standard first point An are defined as standard second points Bn, and the points on the tread face Tn which are spaced each from the other by 0.9 times of the tread width and centered on the standard first point An are defined as standard third points Cn. Moreover, the point on the tire equator on the tread face Ts when inflated to 10% internal pressure is defined as 10% first point As, the point where a radial line passing each standard second point Bn crosses with the tread face Ts is defined as 10% second point Bs, and the point where a radial line passing the standard third point Cn crosses with the tread face Ts is defined as 10% third point Cs.

In the tire 1, the first point gap LA which is the distance between the standard first point An and the 10% first point As is set at less than 1.0 mm.

Furthermore, the third point gap LC which is the distance between the standard third point Cn and the 10% third point Cs is designed at 1.0 mm or longer and 4.0 mm or shorter, and the ratio LC/LA of the third point gap LC to the first point gap LA is set at 4.0 or more.

As described above, in the crown region defined between the standard second points Bn and centered on the standard first point An, the amount of the expansion from the tread face Ts to Tn by the inflation from 10% to 100% of the standard internal pressure is set to be small. To the contrary, the amount of the radially outward movement in the shoulder regions around the standard third points Cn, that is, the third point gap LC is designed to be large. Consequently, the carcass 6 pushes up the belt 7 especially around the edges thereof as the internal pressure is increased, which increases the bonding force between the carcass 6 and the belt 7.

Therefore, it becomes possible to work the tensile force acting on the carcass 6 on the belt 7 particularly at the edges thereof. As a result the hoop effect of the belt 7 is enhanced. Accordingly, the ground contact face makes a relatively large rough rectangular shape as shown in FIG. 5, and the portion k with a large ground contact pressure can be located in the shoulder regions.

It causes a reduction in the wear and lessen uneven wear including shoulder wear and spot wear. In addition to the improvement in the fuel economy due to the reduction of the rolling resistance, the wet brake performance can be also improved. Moreover, the steering stabilities such as steering wheel response, cornering power, cornering stability and straight drive stability can be improved.

Concerning the first point gap LA, the present invention includes a deformation or movement as the standard first point An becomes located radially inward of the 10% first point As.

When the ratio LS/LA of the third point gap LC to the first point gap LA is set smaller than 4.0, the operation and effects described above cannot be fully exerted.

Meanwhile, the radius of curvature of the arc passing the standard first point An and the two standard second points Bn is defined as the standard inner radius $RC_n$, and the radius of curvature of the arc passing the standard first point An and the two standard third points Cn is also defined as the standard outer radius RS, and then the common logarithm $\log_{10}(RC_n/RS_n)$ of the ratio $RC_n/RS_n$ of the standard inner radius $RC_n$ to the standard outer radius RS is set between 1.0 and 0.7, whereby the ratio $RC_n/RS_n$ is in a range between about 1.36 and 5.01.

In this way, by setting the standard outer radius $RS_n$ smaller than the standard inner radius in the range of the above ratio, the curvature of the arc passing the shoulder region becomes large.

Accordingly, the crown region and shoulder region of the tread face Tn are formed in an arc with a larger radius of curvature and an arc with a smaller radius of curvature, respectively. That is, the tread profile becomes the so-called double-radius profile.

This is one of the conditions for making the ground contact face in an octangular shape and to locate the portion K with a large ground contact pressure at the crown region as shown in FIG. 6. By adding this condition to those described above, it becomes possible to obtain the tread shape in which the ground contact pressures are distributed uniformly, as shown in FIG. 7. Besides, this fact further improves the wear resistance and steering stability described above.

The reason why the common logarithm $\log_{10}(RC_n/RS_n)$ is set at 0.1 or more is that the above features of the double-radius profile cannot be exerted when the value is less than 0.1. To the contrary, when it is over 0.7, the standard outer radius $RS_n$ becomes excessively smaller than the standard inner radius $RC_n$, and the radius of curvature of the arc at the shoulder regions is decreased, and as a result, the shoulder regions insufficiently contact with the ground, which impedes the effects brought about by the first embodiment.

It is moreover, preferable to alter this value depending on the aspect ratio S. When the aspect ratio S is over 0.8, the value is preferably set between 0.10 and 0.40, and when the aspect ratio S is over 0.6, the value is preferably set between 0.25 and 0.55, and when the aspect ratio S is 0.6 or less, the value is preferably set between 0.35 and 0.65.

The reason why the radius $RC_n/RS_n$ should be set larger as the aspect ratio becomes smaller, that is, the tire is more depressed, is that the tire width $SW_n$ relatively increases in comparison with the tire height Hn by the depression, which causes an increase in the deflection at the tread face Tn when contacting the ground, and thereby the shoulder region can easily contact with the ground.

The standard inner radius $RC_n$ is set 2.7 times or more and 5.0 times or less than the value $TW_n/S$ obtained by dividing the tread width $TW_n$ by the tire aspect ratio S.

By limiting the standard inner radius $RC_n$ in the above range, the tread face Tn is formed appropriately, and the amount of the outward movement of the shoulder portions is increased, thereby enhancing the hoop effect at the shoulder regions.

This value, meanwhile, determines the standard inner radius $RC_n$ with regard to the tread width $TW_n$, and furthermore the value qualitatively-determines the radius with regard to the tread width per unit length, that is, the difference in radius between the standard third point Cn and the standard first point An. By adjusting this value, depending on the aspect ratio S, the quantity of the outward movement of the shoulder portion due to inflation to a standard internal pressure is increased to contribute to the improvement of the hoop effect at the shoulder regions, and to form the tread face Tn in the most appropriate shape.

When the value is less than 2.7, the standard outer radius $RS_n$ to the tread width becomes small, and the amount of the outward movement of the shoulder portions tends to become excessively large, and the ground contact at the shoulder region becomes difficult.

When the value is larger than 5.0, to the contrary, the tread face becomes excessively flat and the ground contact pressure at the shoulder becomes too high.

Concerning the distribution of the tread thickness, the absolute value $|a-b|$ of the difference between the tread thickness a at the standard first point An and the tread thickness b at the standard second point Bn is set to be 0.3 mm or less, and the thickness b-c obtained by subtracting the tread thickness c at the standard third point Cn from the tread thickness b is set in the range from 0.5 mm to 3.0 mm and more preferably from 1.3 to 3.0 mm.

In this way, the tread thicknesses a and be should be almost equivalent having 0.3 mm or less of the absolute value of their difference. The thickness b-c of substracting the tread thickness c from the tread thickness b is limited within 0.5 mm or more and 3.0 mm or less, and by substracting the tread thickness c at the standard third point Cn in such a way, the amount of the outward movement of the shoulder portions by inflation of the tire is enlarged, thereby forming the tread face in a desirable double radius profile.

The tread thickness stated here means the thickness measuring from the tread face Tn to the upper face 7a of the belt 7 at a right angle to the tread face Tn.

When the thickness b-c is less than 0.5 mm, the tread thickness at the points are excessively equalized to exert inferior effects, when it is over 3.0 mm, the strength at the shoulder is lessened to cause deterioration in the durability, and at the same time the amount of outward movement of this portion overgrows to make it difficult to form a proper double-radius profile.

Such a tire 1 can be manufactured by a vulcanizing mold having a middle swollen shape which violates the theory of spontaneously balanced shape on purpose.

Figure 9:
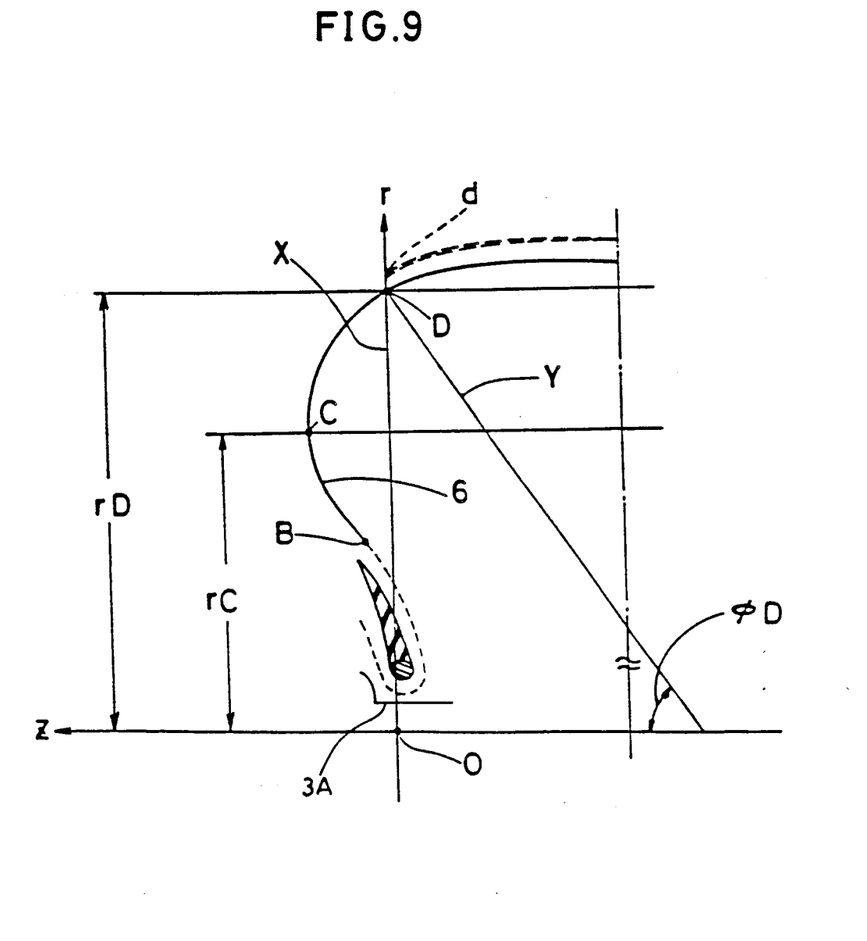
FIG. 9 is a diagram explaining the spontaneously balanced shape.

On the theory of spontaneously balanced shape, the carcass profile can be obtained by the following equation.

$$Z = \int_r^{rD} \frac{r^2 - rC^2}{\sqrt{(rD^2 - rC^2)^2/\sin^2\Phi D - (r^2 - rC^2)^2}} \, dr \quad (1)$$

where, as shown in FIG. 9.

D: an intersection of a perpendicular X extending from the edge d of the belt 7 in the radial direction and rectangular to the axle Z, that is, the Z-axis in this embodiment, with the carcass 6, C: point where the carcass is in the maximum width, r: the height from the Z-axis in the radial direction of the tire (r-axis in this embodiment), rC: the height from the Z-axis to the point C on the carcass 6 in the radial direction, rD: the height from the Z-axis to the intersection D on the carcass 6 in the radial direction, and $\Phi$D: an angle formed by a normal line Y to the carcass at the intersection D and the Z-axis.

The Z-axis can be replaced by a line horizontally passing the bead bottom 3A. On the assumption that the carcass 6 makes an arc at least near the edge of the belt 7, the Equation (1) is obtained by regarding the intersection 0 of the Z-axis with the r-axis passing the intersection D as the origin.

Accordingly, by giving the height r, the deviation from the r-axis in the horizontal direction, that is, the value Z can be calculated, and a curve depending on the theory of spontaneously balanced shape can be obtained.

In the theory of the spontaneously balanced shape, as apparent from equation (1), when the locations at the heights rC and rD and the angle $\Phi$D are given, the line is determined. Here, if the value z at the point C can be preliminarily given, by offering either one of the angle $\Phi$D or the height rC, the other can be obtained.

Conversely, in the tire 1 of the present invention, the height in the radial direction from the bead bottom 3A to the location C where the carcass of the mold tire 1 in a vulcanizing mold becomes widest, is set shorter than the height obtained by the theory of spontaneously balanced shape, so that the carcass profile is formed in the shape swollen at the lower part. This height is limited in a range from 35% to 55% of the height of the mold tire, and further the maximum width of the carcass 6 is set longer than the maximum width obtained by the theory of the spontaneously balanced shape in a range of the ratio from 1 to 1.1.

The tire 1 of the present invention can be produced by departing from the spontaneously balanced shape.

Besides, in the tire of this embodiment, the point on the sidewall spaced apart 30 mm distance 1 from the lower end of the bead which is the reference for the ordinary rim radius in the radial direction, is defined as standard fourth point En when inflated to the standard internal pressure, and defined as 10% fourth point ES when inflated to the 10% internal pressure. And the distance between these two points in the axial direction is 1.0 mm or shorter.

Accordingly, the riding comfort, which tends to be decreased by the increase of the stiffness of the tire accompanying a large outward movement of the shoulder portions, can be maintained and raised.

TEST EXAMPLE 1

Tires of size 5.60 R13 having the structure shown in FIGS. 1 and 2 were made by way of trial according to the specifications shown in Table 1, and the tire was mounted on a 4-J×13 rim.

The belt 7 used was composed of two plies of steel cords, and the carcass was composed of one ply of polyester cords.

The dimension at the points including the standard first point An, the standard third point Cn and the 10% first point As to the 10% third point Cs were measured from the drawings showing sectional contours of the tire when inflated to the standard internal pressure and the 10% internal pressure and plotted by using a laser deviation measuring instrument.

The tread thicknesses a, b, c were measured by cutting the tire after the measurement.

Figure 3:
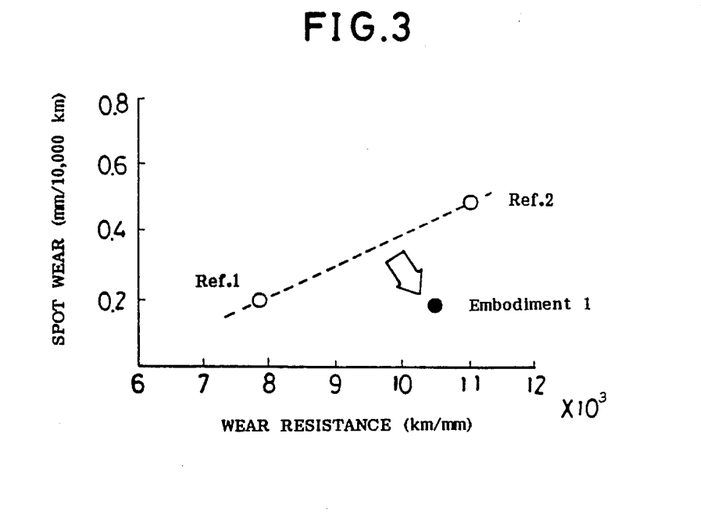
FIG. 3 is a diagram showing the relationship between wear resistance and spot wear.

The test result obtained by mounting the tires on the rear wheel of a 1800 cc FF car with toe-in of 4 mm and driving 50,000 km is shown in FIG. 3. It is found out that, in embodiment 1, the runable distance per unit thickness was relatively long, and that the spot wear index was low.

In addition, the rolling resistance was measured by using a drum. The resistance (kg) was measured by rotating the drum at the speed corresponding to the driving speed of 80 km/h, and it was expressed by the index assuming the value of Reference 1 as 100. In this expression, the smaller the value, the smaller the rolling resistance. It is clarified that, in Embodiment 1, the rolling resistance was small as shown in Table 1, and the fuel economy was improved.

Moreover, the wet brake performance was examined by mounting four tires on an 1500 cc FF car, and driving on a paved road at the speed of 60 km/h, and measuring the running distance to stop when the tires were locked. The distance to the stop was expressed by an index regarding that in Reference 1 as 100. The Embodiment 1 was superior in this test as shown in Table 1.

TEST EXAMPLE 2

Tires of size 205/60R14 87H were produced by way of trial according to the specification shown in Table 2, and the tire was mounted on a 5½ JJ×14 rim, and the rolling resistance and wet brake performances were measured in the same way to the above. The obtained data are shown in Table 2. The wet brake performances were measured by using an 2000 cc FR type car.

Furthermore, the steering wheel response, cornering limit, stability at the cornering limit, stability in straight high speed running were evaluated through the driver's feeling by mounting the tires on a 2000 cc FF type car and driving in the test course.

The results are shown by the index based on the assumption that Reference 1 is 3, wherein the larger values express better results. From the results, it is found out Embodiment 2 showed superior data in either test.

TABLE 1

|  | Ref. 1 | Ref. 2 | Embodiment 1 |
| --- | --- | --- | --- |
| First point gap LA mm | 0.2 | 0.2 | 0.2 |
| Third point gap LC mm | 0.3 | 1.5 | 1.3 |
| Fourth point gap LE mm | 2.0 | 0.2 | 0.4 |
| Ratio LC/LA | 1.5 | 7.5 | 6.5 |

TABLE 1-continued

|  | Ref. 1 | Ref. 2 | Embodiment 1 |
|---|---|---|---|
| Standard inner radius RCn mm | 240 | 280 | 320 |
| Standard outer radius RSn mm | 240 | 260 | 240 |
| Log10 (RCn/RSn) | 0 | 0.032 | 0.125 |
| Tread width TWn mm | 108 | 110 | 106 |
| Tire height Hn mm | 135 | 135 | 135 |
| Tire maximum height SWn mm | 146 | 148 | 148 |
| Aspect ratio S | 0.92 | 0.91 | 0.91 |
| Ratio (TWn/S) | 117.4 | 120.9 | 116.5 |
| Ratio RCn/(TWn/S) | 2.04 | 2.32 | 2.75 |
| Tread thickness a mm | 11.6 | 12.0 | 12.1 |
| Tread thickness b mm | 11.8 | 12.0 | 12.2 |
| Tread thickness c mm | 12.0 | 12.0 | 11.7 |
| Difference \|a-b\| mm | 0.2 | 0 | 0.1 |
| Difference (b-c) mm | -0.2 | 0 | 0.5 |
| Test results |  |  |  |
| Rolling resistance | 100 | 70 | 88 |
| Wet brake performance | 100 | 99 | 96 |

TABLE 2

|  | Ref. 3 | Ref. 4 | Embodiment 2 |
|---|---|---|---|
| First point gap LA mm | 0.2 | 0.4 | 0.3 |
| Third point gap LC mm | 0.2 | 0.6 | 1.7 |
| Fourth point gap LE mm | 2.0 | 1.9 | 0.3 |
| Ratio LC/LA | 1.0 | 1.5 | 5.7 |
| Standard inner radius RCn mm | 680 | 1000 | 1150 |
| Standard outer radius RSn mm | 420 | 380 | 400 |
| Log10 (RCn/RSn) | 0.209 | 0.42 | 0.459 |
| Tread width TWn mm | 174 | 174 | 174 |
| Tire height Hn mm | 123 | 123 | 123 |
| Tire maximum height SWn mm | 205 | 205 | 204 |
| Aspect ratio S | 0.60 | 0.60 | 0.60 |
| Ratio (TWn/S) | 290 | 290 | 290 |
| Ratio RCn/(TWn/S) | 2.34 | 3.45 | 3.97 |
| Tread thickness a mm | 12.0 | 11.8 | 12.0 |
| Tread thickness b mm | 11.9 | 12.0 | 11.9 |
| Tread thickness c mm | 11.6 | 11.0 | 10.0 |
| Difference \|a-b\| mm | 0.1 | 0.2 | 0.1 |
| Difference (b-c) | 0.3 | 1.0 | 1.9 |
| Test results |  |  |  |
| Steering wheel response | 3 | 2.8 | 3.2 |
| Cornering limit | 3 | 2.8 | 3.2 |
| Stability at cornering limit | 3 | 3.2 | 3.2 |
| Stability in high speed straight running | 3 | 3.2 | 3.2 |
| Rolling resistance | 100 | 98 | 92 |
| Wet brake | 100 | 98 | 97 |

[EFFECTS OF THE INVENTION]

As the tire is formed in the above-mentioned structure, the amount of the outward movement of the shoulder portions becomes larger than that of the crown portion, and the carcass pushes up the belt especially around the shoulder regions along with an increase of the internal pressure, which causes an increase in the bonding force between the carcass and the belt. Accordingly, it becomes possible to work the tensile force acting on the carcass on the belt in particular at its edges, and therefore the hoop effect of the belt is enhanced.

Concerning the shape of the ground contact face, the portions K, K with a large ground contact pressure exist in the shoulder regions of the tire as shown in FIG. 5, and the area of the ground contact face can be widened. Accordingly, the wear resistance is reaised, uneven wear such as spot wear can be reduced, the fuel consumption property can be improved due to a decrease of the rolling resistance, the wet brake performance is advanced, the cornering performance is strengthened, and the steering stability, stability when cornering and stability when running straight can be improved.

In the second embodiment, the standard inner radius RCn is set at 2.7 times or more and 5.0 times or less of the values TWn/S obtained by dividing the tread width TWn when the standard internal pressure is applied by the aspect ratio S. This causes to optimize the radius of curvature of the arc of the shoulder portions with regard to the unit tread width, that is, the standard outer radius RCn in the shape of the tread face Tn when inflated to standard internal pressure. Furthermore, this is equal to setting the difference in the radii between the standard first point An on the equator of the tire and the standard third point Cn on the shoulder region. By determining this value by considering the aspect ratio S, the operation and effects brought by the above first invention are enhanced.

In the second embodiment, moreover, the common logarithm of the ratio of the standard inner radius RCn to the standard outer radius RSn is in the range between 0.1 and 0.7. This adds to the tire the condition which leads to the fact that the ground contact face becomes relatively large in the double-radius profile in which the portion K with a large ground contact pressure is located in the crown region when the standard internal pressure is applied as described in FIG. 6. By the addition of this condition, the ground contact pressure distribution almost uniformed throughout the whole ground contact face as shown in FIG. 8 can be obtained.

Besides, the difference between the tread thicknesses a and b at the standard first point An and standard second point Bn, respectively is set at 0.3 mm or less and the thickness b-c obtained by subtracting the tread thickness c at the standard third point Cn from the above tread thickness b is set at 0.5 mm or more and 3.0 mm or less. In this way, by slightly reducing the tread thickness of the shoulder portion, the pushing-up force of the shoulder described above can be enforced, the shape of tread face is set most appropriate, and the preferable double-radius profile is kept, thereby enhancing the above effects.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

We claim:

1. A pneumatic tire having a profile comprising:
a radial distance (LA) between a standard first point (An) on the tire equator on the tread surface (Tn) when the tire is inflated to a standard internal pressure and a 10% first point (As) on the tire equator on the tread surface (Ts) when the tire is inflated to 10% of said standard internal pressure is smaller than 1.0 mm;
a radial distance (LC) between a standard third point (Cn) on said tread face (Tn) spaced apart 0.45 times the tread width (TWn) when inflated to the standard internal pressure from said standard first point (An) and a 10% third point (Cs) defined as the intersection of the radial line passing through said standard third point (Cn) with said tread face (Ts) is not smaller than 1.0 mm and smaller than 4.0 mm;
the ratio (LC/LA) of the distance, (LC) to the distance (LA) is not smaller than 4.0;

the common logarithm $\log_{10}(RCN/RSn)$ of the ratio (RCn/RSn) of a standard inner radius (RCn) defined as the radius of curvature of a circular arc passing said standard first point (An) and two standard second points (Bn) on the tread face (Tn) centered on the standard first point (An) and spaced apart each from the other by 0.5 times said tread width (TWn) to a standard outer ratios (RSn) defined as the radius of curvature of a circular arc passing the standard first point (An) and the two standard third point (Cn) one on each side thereof is not less than 0.1 and not more than 0.7;

said standard inner radius (RCn) is more than 2.7 times and less than 5.0 times a value (TWn/S) obtained by dividing said tread with (TWn) by the tire aspect ratio (S) which is the ratio (Hn/SWn) of the height (Hn) of the tire to the maximum width (SWn) of the tire when inflated to the standard internal pressure;

the absolute value la-bl of the difference between the tread thickness (a) at the standard first point (An) and the tread thickness (b) at the standard second points (Bn) is not more than 0.3 mm;

the thickness (B-C) obtained by subtracting the tread thickness (c) at the standard third point (Cn) from the tread thickness (b) is not less than 0.5 mm and not more than 3.0 mm; and an axial distance (LE) between a standard forth point (En) on the sidewall face spaced apart 30 mm from the base of bead of the tire in the radial direction when inflated to the standard internal pressure and a 10% forth point (Es) on the sidewall face spaced apart 30 mm from the base of the bead in the radial direction when inflated to 10% of the standard internal pressure is not more than 1.0 mm.

* * * * *